United States Patent
DeLuca et al.

(10) Patent No.: US 9,544,264 B1
(45) Date of Patent: Jan. 10, 2017

(54) AUGMENTING LOCATION OF SOCIAL MEDIA POSTS BASED ON PROXIMITY OF OTHER POSTS

(71) Applicant: International Business Machines Corporation, Armonk, NY (US)

(72) Inventors: Lisa Seacat DeLuca, Baltimore, MD (US); Shaila Pervin, Docklands (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/077,773

(22) Filed: Mar. 22, 2016

(51) Int. Cl.
| | | |
|---|---|---|
| G06F 17/30 | (2006.01) | |
| G06F 7/00 | (2006.01) | |
| H04L 12/58 | (2006.01) | |
| H04L 29/08 | (2006.01) | |
| H04W 64/00 | (2009.01) | |

(52) U.S. Cl.
CPC ............... *H04L 51/32* (2013.01); *H04L 67/18* (2013.01); *H04W 64/00* (2013.01)

(58) Field of Classification Search
CPC .......... H04W 64/00; H04L 67/18; H04L 51/32
See application file for complete search history.

(56) References Cited

U.S. PATENT DOCUMENTS

| | | | | |
|---|---|---|---|---|
| 8,224,351 B1 * | 7/2012 | Sushkov | ................... | G01S 5/02 340/539.13 |
| 8,233,666 B2 * | 7/2012 | Schultz | ................... | G01C 11/02 348/143 |
| 8,635,192 B2 | 1/2014 | Klassen | | |
| 8,737,991 B2 * | 5/2014 | Rao | ........................ | H04W 64/00 370/328 |
| 8,756,235 B2 * | 6/2014 | Nakagawa | ......... | G06F 17/30265 707/741 |
| 8,787,944 B2 * | 7/2014 | Smith | .................... | H04W 64/00 455/404.2 |
| 8,818,422 B2 | 8/2014 | Greenberg | | |
| 8,824,748 B2 | 9/2014 | Tseng | | |
| 8,838,659 B2 * | 9/2014 | Tunstall-Pedoe | ......... | G06N 5/02 706/47 |
| 9,055,408 B2 * | 6/2015 | Peterson | ................ | H04W 4/028 |
| 9,361,406 B1 * | 6/2016 | Taropa | ................. | G06F 17/3097 |
| 2005/0034084 A1 * | 2/2005 | Ohtsuki | ................... | G06T 15/04 715/864 |
| 2007/0118508 A1 * | 5/2007 | Svendsen | ........... | G06F 17/30265 |
| 2009/0222482 A1 * | 9/2009 | Klassen | ............. | G06F 17/30241 |
| 2010/0251305 A1 * | 9/2010 | Kimble | .............. | H04N 7/17318 725/46 |
| 2014/0095509 A1 | 4/2014 | Patton | | |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

*Primary Examiner* — Jeff A. Burke
(74) *Attorney, Agent, or Firm* — Sherman IP LLP; Kenneth L. Sherman; Steven Laut

(57) ABSTRACT

A process for augmenting social media posts with location information includes a processor generating a social media message without location information marking. Scanning is performed for one or more electronic devices within vicinity of the processor. Location of the electronic device is determined. The social media message is marked with location information.

1 Claim, 6 Drawing Sheets

(56) References Cited

U.S. PATENT DOCUMENTS

| | | | |
|---|---|---|---|
| 2014/0171126 A1* | 6/2014 | Mayor | G01S 5/14 455/456.6 |
| 2014/0179341 A1* | 6/2014 | Sydir | H04W 64/00 455/456.1 |
| 2014/0189733 A1* | 7/2014 | Anguiano | H04W 4/206 725/35 |
| 2014/0195625 A1 | 7/2014 | Weldon | |
| 2014/0236882 A1* | 8/2014 | Rishe | G06F 17/30477 706/50 |
| 2014/0236916 A1* | 8/2014 | Barrington | G06F 17/30864 707/706 |

* cited by examiner

AUGMENTING LOCATION OF SOCIAL MEDIA POSTS BASED ON PROXIMITY OF OTHER POSTS

BACKGROUND

Knowing the geolocation that triggered a social media message can add a lot of value to individuals reading the messages. Especially with a social platform, such as TWITTER® where it can be helpful to understand a little more about the event being discussed. Often times people do not take the time to manually tag a geolocation on a social message or they do not leave their GPS turned on, so the location is not accurate.

SUMMARY

Embodiments relate to augmenting social media posts with location information based on close proximity posts. One embodiment includes a computer program product for augmenting social media posts with location information, the computer program product comprising a computer readable storage device having program instructions embodied therewith, the program instructions executable by a processor to cause the processor to: generate, by the processor, a social media message without location information marking. The processor further scans for one or more electronic devices within vicinity of the processor. The processor additionally determines location of the one or more electronic devices based on at least one of: sharing location information with the processor, mining published location information generated by the one or more electronic devices, comparing locations of the one or more electronic devices, and one of: upon a determination that the locations of the one or more electronic devices are a same location, retrieving the same location as location information, and upon a determination that the locations of the one or more electronic devices are not all the same locations, generating a possible location list of the locations of the one or more electronic devices, determining a most common location between the locations of the one or more electronic devices, and retrieving the most common location as the location information. Additionally, the processor marks the social media message with the location information.

These and other features, aspects and advantages of the present invention will become understood with reference to the following description, appended claims and accompanying figures.

DETAILED DESCRIPTION

Figure 1:
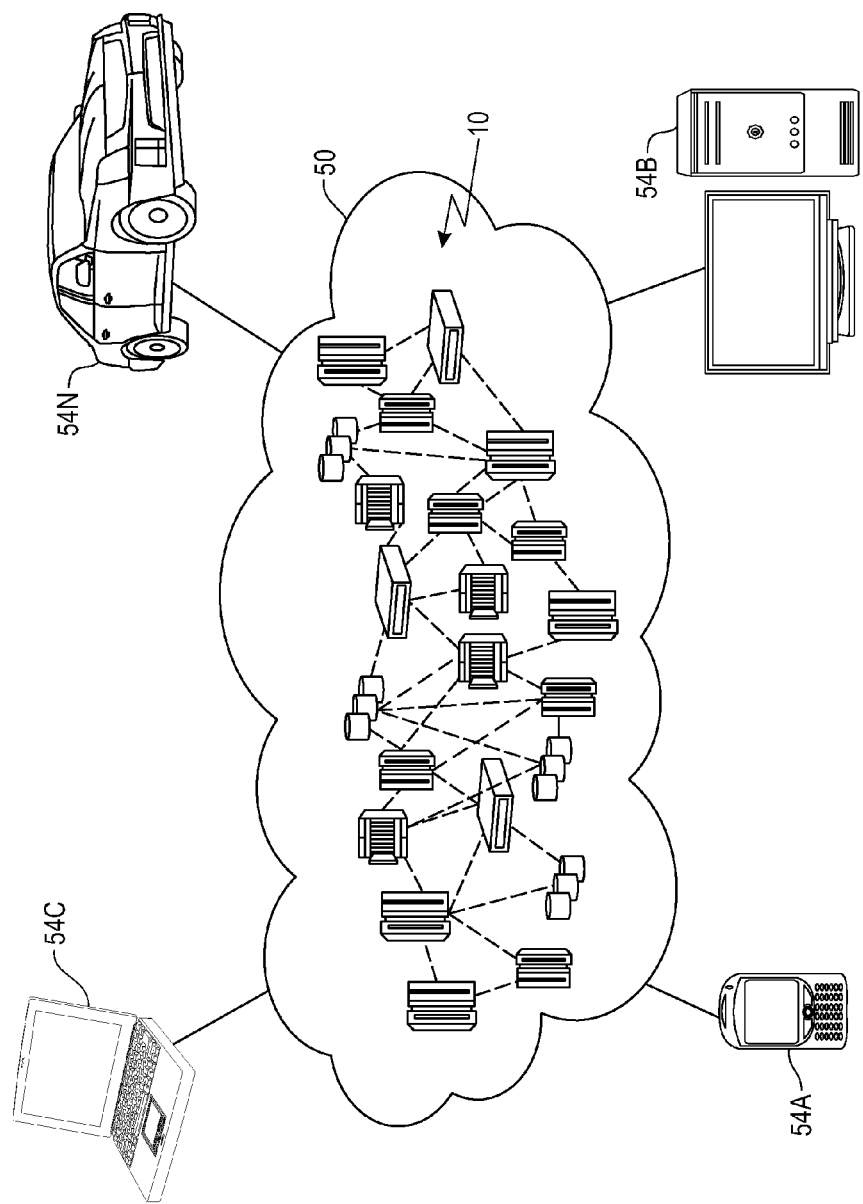
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide for augmenting social media posts with location information based on close proximity posts. One embodiment includes a computer program product for augmenting social media posts with location information, the computer program product comprising a computer readable storage device having program instructions embodied therewith, the program instructions executable by a processor to cause the processor to: One embodiment includes a computer program product for augmenting social media posts with location information, the computer program product comprising a computer readable storage device having program instructions embodied therewith, the program instructions executable by a processor to cause the processor to: generate, by the processor, a social media message without location information marking. The processor further scans for one or more electronic devices within vicinity of the processor. The processor additionally determines location of the one or more electronic devices based on at least one of: sharing location information with the processor, mining published location information generated by the one or more electronic devices, comparing locations of the one or more electronic devices, and one of: upon a determination that the locations of the one or more electronic devices are a same location, retrieving the same location as location information, and upon a determination that the locations of the one or more electronic devices are not all the same locations, generating a possible location list of the locations of the one or more electronic devices, determining a most common location between the locations of the one or more electronic devices, and retrieving the most common location as the location information. Additionally, the processor marks the social media message with the location information.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
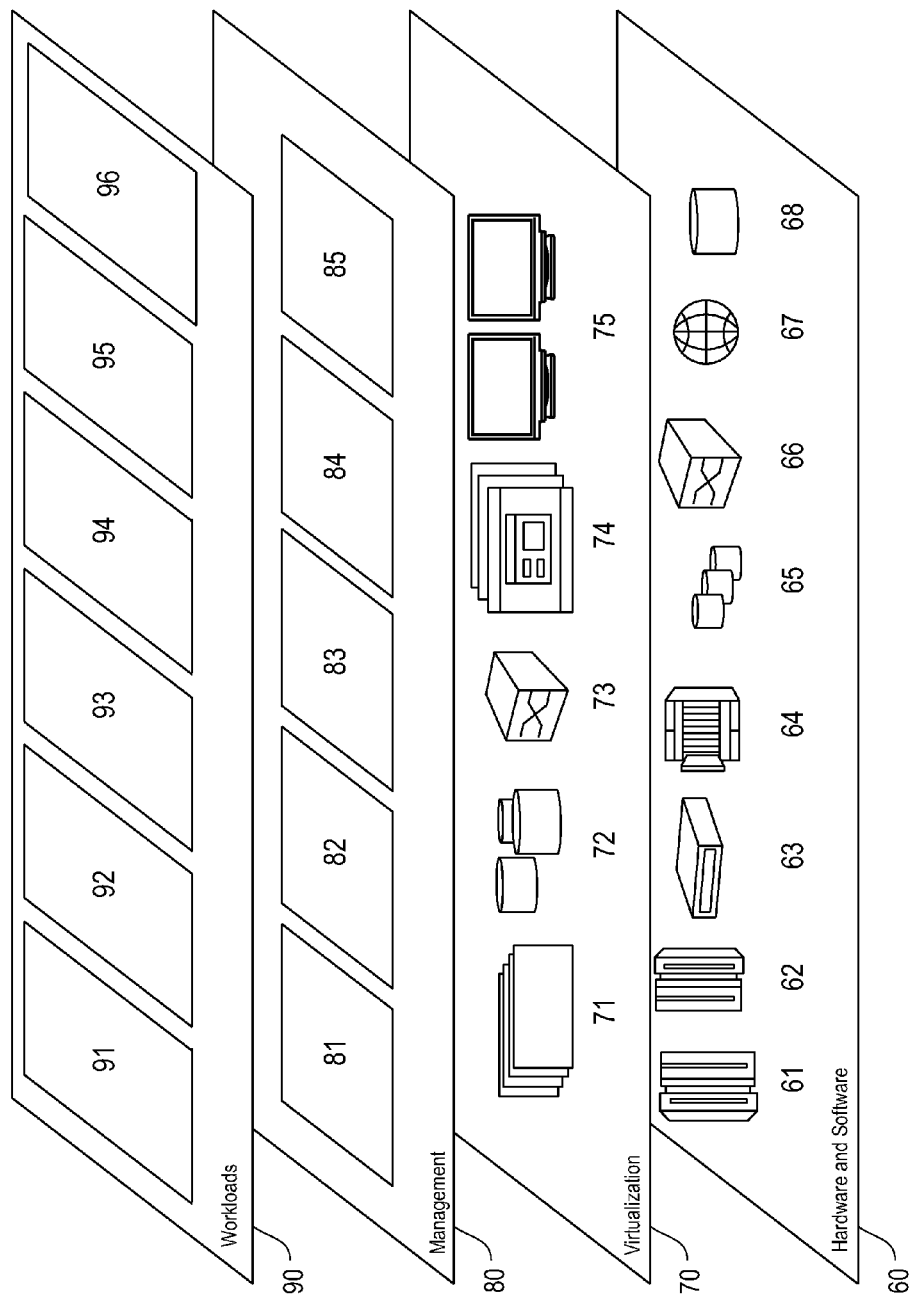
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and retention, recommendation and collaboration of mobile based task sessions 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the electronic device 420 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
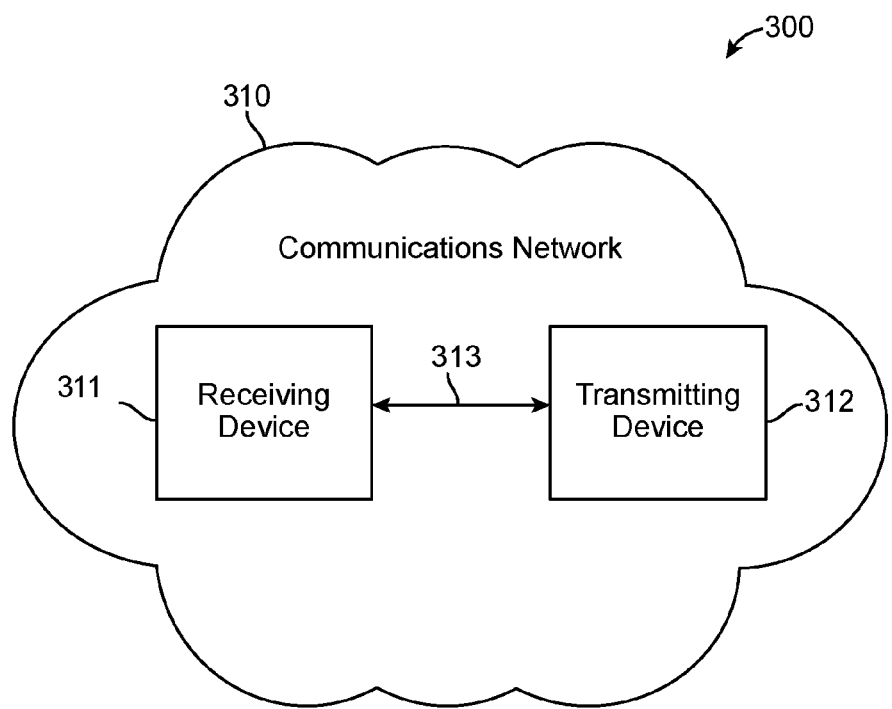
FIG. 3 shows a schematic view of a communications system, according to an embodiment.

FIG. 3 is a schematic view of a communications system 300, in accordance with one embodiment. Communications system 300 may include a communications device that initiates an outgoing communications operation (transmitting device 312) and a communications network 310, which transmitting device 312 may use to initiate and conduct communications operations with other communications devices within communications network 310. For example, communications system 300 may include a communication device (receiving device 311) that receives the communications operation from the transmitting device 312. Although communications system 300 may include multiple transmitting devices 312 and receiving devices 311, only one of each is shown in FIG. 3 to simplify the drawing.

Any suitable circuitry, device, system or combination of these (e.g., a wireless communications infrastructure including communications towers and telecommunications servers) operative to create a communications network may be used to create communications network 310. Communications network 310 may be capable of providing communications using any suitable communications protocol. In some embodiments, communications network 310 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 310 may support protocols used by wireless and cellular phones and personal email devices. Such protocols may include, for example, GSM, GSM plus EDGE, CDMA, quadband, and other cellular protocols. In another example, a long range communications protocol can include Wi-Fi and protocols for placing or receiving calls using VOW, LAN, WAN, or other TCP-IP based communication protocols. The transmitting device 312 and receiving device 311, when located within communications network 310, may communicate over a bidirectional communication path such as path 313, or over two unidirectional communication paths. Both the transmitting device 312 and receiving device 311 may be capable of initiating a communications operation and receiving an initiated communications operation.

The transmitting device 312 and receiving device 311 may include any suitable device for sending and receiving communications operations. For example, the transmitting device 312 and receiving device 311 may include mobile telephone devices, television systems, cameras, camcorders, a device with audio video capabilities, tablets, wearable devices, other smart devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, communications with calendaring applications, or combinations of these (e.g., video conferences).

Figure 4:
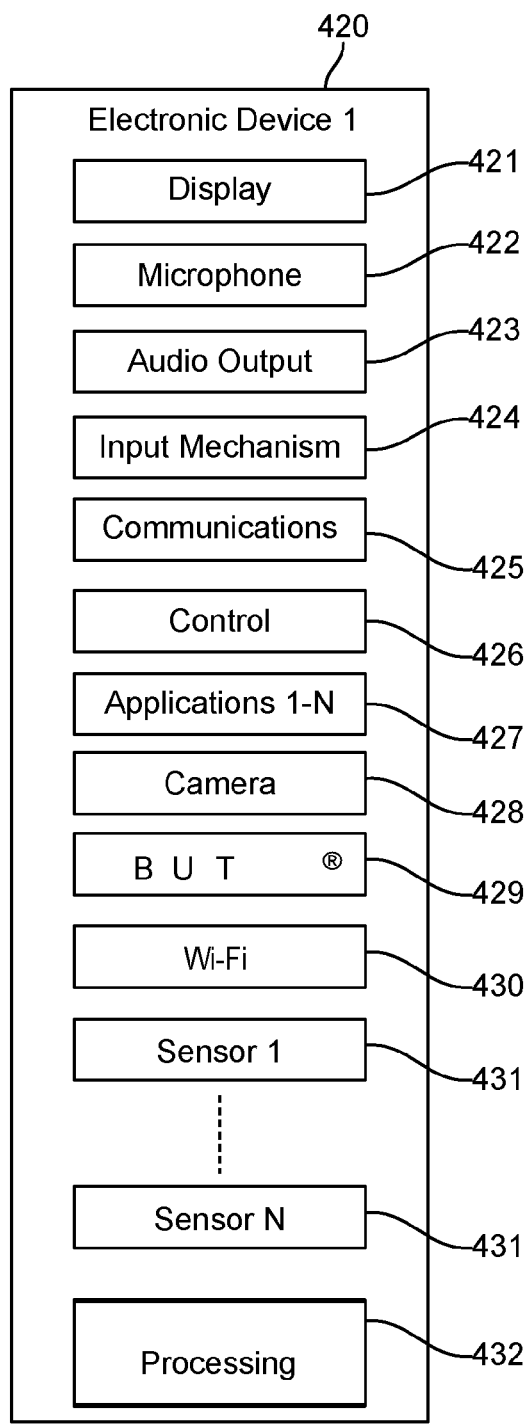
FIG. 4 shows a block diagram of architecture for a mobile electronic device system including geolocation processing, according to an embodiment.

FIG. 4 shows a functional block diagram of a mobile electronic device 420 that may be used for geolocation processing 432, according to one embodiment. Both the transmitting device 312 (FIG. 3) and receiving device 311 may include some or all of the features of the electronics device 420. In one embodiment, the electronic device 420 may comprise a display 421, a microphone 422, an audio output 423, an input mechanism 424, communications circuitry 425, control circuitry 426, Applications 1-N 427 (e.g., a calendaring application), camera 428, a BLUETOOTH® interface 429, a Wi-Fi interface 430 and sensors 1 to N 431 (N being a positive integer), geolocation processing 432 (e.g., geolocation processing using one or more processors, BLUETOOTH® data, nearby post information, etc.) and any other suitable components. In one embodiment, applications 1-N 427 are provided and may be obtained from a cloud or server via a communications network 410, etc., where N is a positive integer equal to or greater than 1.

In one embodiment, all of the applications employed by the audio output 423, the display 421, input mechanism 424, communications circuitry 425, and the microphone 422 may be interconnected and managed by control circuitry 426. In one example, a handheld music player capable of transmitting music to other tuning devices may be incorporated into the electronics device 420.

In one embodiment, the audio output 423 may include any suitable audio component for providing audio to the user of electronics device 420. For example, audio output 423 may include one or more speakers (e.g., mono or stereo speakers) built into the electronics device 420. In some embodiments, the audio output 423 may include an audio component that is remotely coupled to the electronics device 420. For example, the audio output 423 may include a headset, headphones, or earbuds that may be coupled to communications device with a wire (e.g., coupled to electronics device 420 with a jack) or wirelessly (e.g., BLUETOOTH® headphones or a BLUETOOTH® headset).

In one embodiment, the display 421 may include any suitable screen or projection system for providing a display visible to the user. For example, display 421 may include a screen (e.g., an LCD, LED, etc. screen) that is incorporated in the electronics device 420. Display 421 may be operative to display content (e.g., information regarding communications operations or information regarding available media selections) under the direction of control circuitry 426.

In one embodiment, input mechanism 424 may be any suitable mechanism or user interface for providing user inputs or instructions to electronics device 420. Input mechanism 424 may take a variety of forms, such as a button, keypad, dial, a click wheel, or a touch screen. The input mechanism 424 may include a multi-touch screen.

In one embodiment, communications circuitry 425 may be any suitable communications circuitry operative to connect to a communications network (e.g., communications network 310, FIG. 3) and to transmit communications operations and media from the electronics device 420 to other devices within the communications network. Communications circuitry 425 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quad-band, and other cellular protocols, VOW, TCP-IP, or any other suitable protocol.

In some embodiments, communications circuitry 425 may be operative to create a communications network using any suitable communications protocol. For example, communications circuitry 425 may create a short-range communications network using a short-range communications protocol to connect to other communications devices. For example, communications circuitry 425 may be operative to create a local communications network using the Bluetooth® protocol to couple the electronics device 420 with a BLUETOOTH® headset.

In one embodiment, control circuitry 426 may be operative to control the operations and performance of the electronics device 420. Control circuitry 426 may include, for example, one or more processors, a bus (e.g., for sending instructions to the other components of the electronics device 420), memory, storage, or any other suitable component for controlling the operations of the electronics device 420. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 420 performs communications operations (e.g., saving contact information related to communications operations or storing information related to different media types and media items selected by the user).

In one embodiment, the control circuitry 426 may be operative to perform the operations of one or more applications implemented on the electronics device 420. Any suitable number or type of applications may be implemented. Although the following discussion will enumerate different applications, it will be understood that some or all of the applications may be combined into one or more applications. For example, the electronics device 420 may include a calendaring application (e.g., MICROSOFT® OUTLOOK®, GOOGLE® Calendar, etc.), an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 420 may include one or multiple applications operative to perform communications operations. For example, the electronics device 420 may include a messaging application, a mail application, a voicemail application, an instant messaging application (e.g., for chatting), a videoconferencing application, a fax application, or any other suitable applications for performing any suitable communications operation.

In some embodiments, the electronics device 420 may include a microphone 422. For example, electronics device 420 may include microphone 422 to allow the user to transmit audio (e.g., voice audio) for speech control and navigation of applications 1-N 427, during a communications operation or as a means of establishing a communications operation or as an alternative to using a physical user interface. The microphone 422 may be incorporated in the electronics device 420, or may be remotely coupled to the electronics device 420. For example, the microphone 422 may be incorporated in wired headphones, the microphone 422 may be incorporated in a wireless headset, the microphone 422 may be incorporated in a remote control device, etc.

In one embodiment, the camera 428 comprises one or more camera devices that include functionality for capturing still and video images, editing functionality, communication interoperability for sending, sharing, etc., photos/videos, etc.

In one embodiment, the BLUETOOTH® interface 429 comprises processes and/or programs for processing BLUETOOTH® information, and may include a receiver, transmitter, transceiver, etc.

In one embodiment, the electronics device 420 may include multiple sensors 1 to N 431, such as accelerometer, gyroscope, microphone, temperature, light, barometer, magnetometer, compass, radio frequency (RF) identification sensor, global positioning system (GPS), Wi-Fi, etc. In one embodiment, the multiple sensors 1-N 431 may be aggregated or used from different electronic devices, such as an electronic device 420 (e.g., a smartphone) and another electronic device 420 (e.g., a wearable device such as a smartwatch). For example, a gyroscope sensor and/or a temperature may be used from a wearable device, and a microphone sensor may be used from a smartphone.

In one embodiment, the electronics device 420 may include any other component suitable for performing a communications operation. For example, the electronics device 420 may include a power supply, ports, or interfaces for coupling to a host device, a secondary input mechanism (e.g., an ON/OFF switch), or any other suitable component.

One or more embodiments infer a first location within a first social media message based on the proximity of a first device (e.g., an electronics device 420, FIG. 4) with a second device (e.g., another electronics device 420) in which the second social media message has specified a second location. In one embodiment, a user of a social media platform posts a social media message. The posted message is marked with a location (e.g., selected by the user (e.g., from a list based on current location) or automatically marked by a social platform (e.g., using GPS, Wi-Fi, etc.). A second user of the social media platform creates and post a second social media message, which is not marked with a location (e.g., the user did not select a location, has location services turned off, etc.). In one embodiment, the second device of the second user scans for nearby devices and finds the first user via proximity technology, BLUETOOTH®. etc. The second device determines the location of the first user. In one example, the first user using the first device may trust the second user and share their current location data. The first user's social media messages may be marked as public, therefore, the second device may be aware of the recent messages and mine (e.g., scan and extract text) the messages for location tagging. In one embodiment, if more than one user is found nearby, the locations of the nearby users are compared. If the locations are all the same they are returned to the second device of the second user. If the locations of the nearby users are not the same, a list of possible locations is returned to the second user. The most common location used by the nearby users is returned (e.g., 2 users are in Austin, Tex., 1 user is in Round Rock, Tex.; so the second device returns Austin as the common location. The second social media message is then tagged with the determined location. In one example, the user may be prompted and queried by the second device if they desire to tag the second message with the determined location.

Figure 5:
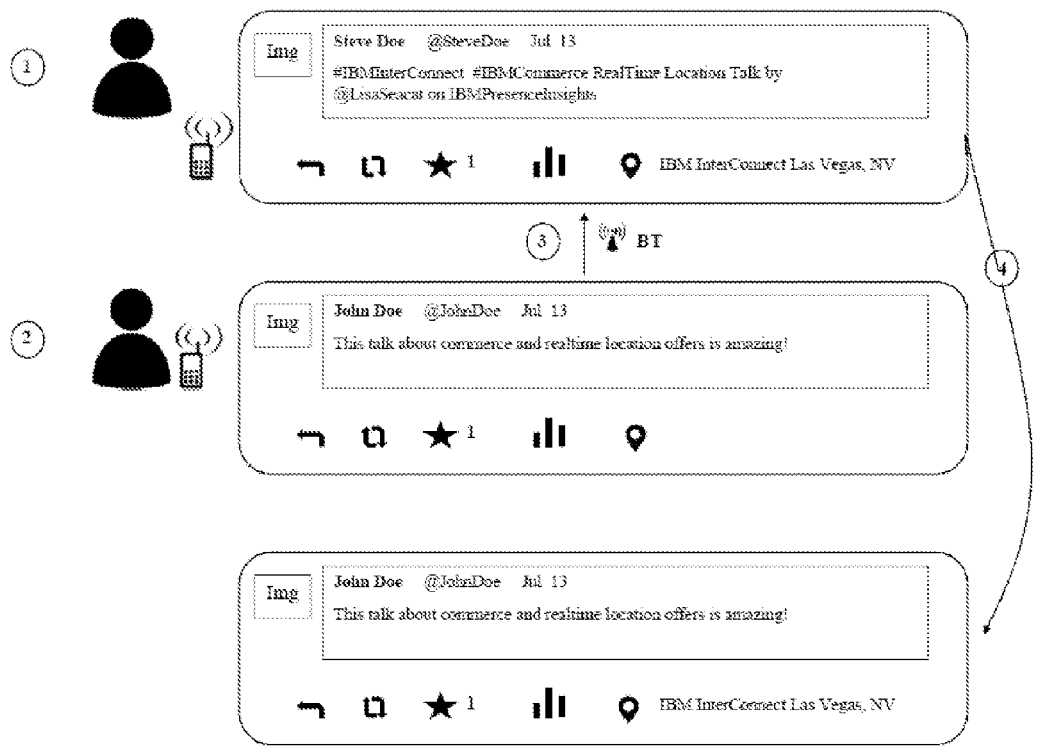
FIG. 5 shows an example for augmenting social media posts with location information, according to an embodiment.

FIG. 5 shows an example for augmenting social media posts with location information, according to an embodiment. In this example, John Doe is attending a conference in Las Vegas, Nev. John Doe's device (e.g., an electronic device 420, FIG. 4) happens to be in close proximity to another attendee, Steve Doe. At (1), Steve Doe posts a message to his social network using an electronic device (e.g., another electronic device 420). The social message from 1 includes location information "IBM InterConnect Las Vegas, Nev.". Shortly after, John Doe posts a social media message at (2). The social media message posted from John Doe's electronic device does not include location data. John Doe's electronic device (e.g., using geolocation processing 432) queries for other devices nearby at (3) and finds Steve Doe's electronic device. John Doe's electronic device performs a lookup process to determine if Steve Doe recently posted any social media messages and finds the social media message from (1). At (4) John Doe's electronic device obtains the location information from Steve Doe's social media message and converts John Doe's message such that the social media message now includes location data.

In one embodiment, even if a location were already entered on a social media message the geolocation processing 432 may still be utilized. In one example, suppose that John Doe's electronic device auto tagged the location as Las Vegas Airport. During the comparison John Doe's electronic device determines that nearby posts are for Las Vegas proper and not the airport. The geolocation processing 432 may therefore present a suggestion on John Doe's electronic device that John Doe change from the airport to the hotel that a conference is being held at. In another example, the geolocation processing may automatically change the location.

Figure 6:
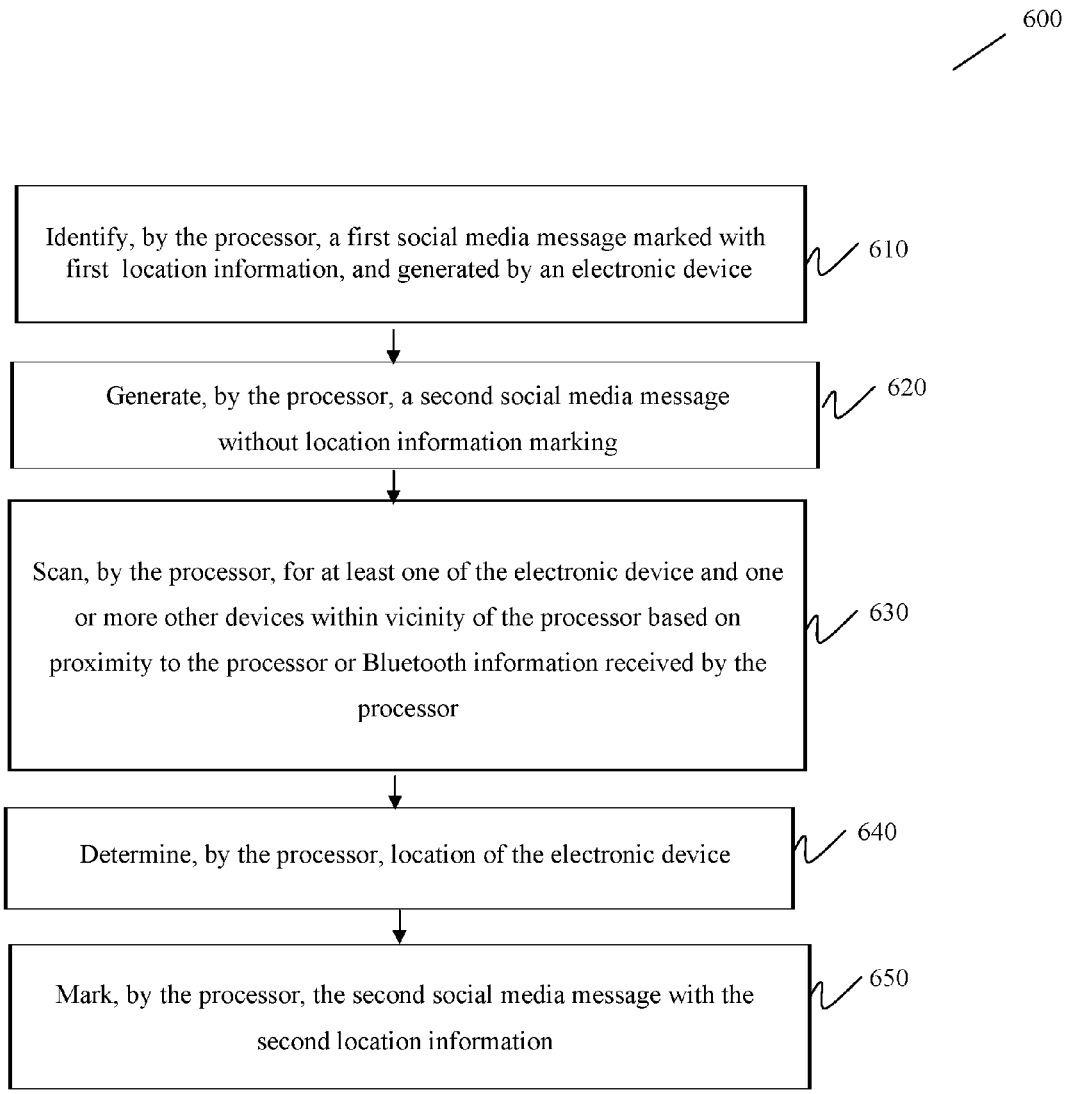
FIG. 6 illustrates a block diagram for a process for augmenting social media posts with location information, according to one embodiment.

FIG. 6 illustrates a block diagram for a process 600 for augmenting social media posts with location information, according to one embodiment. The process 600 includes a computer program product for augmenting social media posts with location information. The computer program product includes a computer readable storage device having program instructions embodied therewith. In block 610, the program instructions are executable by a processor (e.g., a processor in electronic device 420, FIG. 4, a processor in the hardware and software layer 60, FIG. 2, etc.) to cause the processor to generate, by the processor, a social media message without location information marking. In block 620 the processor scans for one or more electronic devices within vicinity of the processor (e.g., based on proximity to the processor, BLUETOOTH® information received by the processor, etc.). In block 640 the processor determines location of the one or more electronic devices. In one embodiment, the processor determines the location based on at least one of: sharing location information with the processor, mining published location information generated by the one or more electronic devices, comparing locations of the one or more electronic devices, and one of: upon a determination that the locations of the one or more electronic devices are a same location, retrieving the same location as location information, and upon a determination that the locations of the one or more electronic devices are not all the same locations, generating a possible location list of the locations of the one or more electronic devices, determining a most common location between the locations of the one or more electronic devices, and retrieving the most common location as the location information. In block 650 the processor marks (e.g., adds location information, adds an icon, adds a symbol, etc.) the social media message with the location information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for augmenting social media posts with location information, the computer program product comprising a computer readable storage device having program instructions embodied therewith, the program instructions executable by a processor to cause the processor to:

generate, by the processor, a social media message without location information marking;

scan, by the processor, for one or more electronic devices within vicinity of the processor;

determine, by the processor, location of the one or more electronic devices based on at least one of:

sharing location information with the processor;

mining published location information generated by the one or more electronic devices; and comparing locations of the one or more electronic devices, and based on the comparing:

upon a determination that the locations of the one or more electronic devices are a same location, retrieving the same location as location information; and upon a determination that the locations of the one or more electronic devices are not all the same locations:
    generating a possible location list of the locations of the one or more electronic devices;
    determining a most common location between the locations of the one or more electronic devices; and
    retrieving the most common location as the location information; and mark, by the processor, the social media message with the location information.

\* \* \* \* \*